United States Patent [19]
Seidel

[11] 3,980,967
[45] Sept. 14, 1976

[54] DIFFERENTIAL FEEDBACK AMPLIFIER WITH FREQUENCY-SHAPED REFERENCE SIGNAL

[75] Inventor: Harold Seidel, Warren, N.J.
[73] Assignee: Bell Telephone Laboratories, Incorporated, Murray Hill, N.J.
[22] Filed: Mar. 14, 1975
[21] Appl. No.: 558,202

[52] U.S. Cl. .............................. 330/149; 330/69; 330/85; 330/151
[51] Int. Cl.² ...................................... H03F 1/28
[58] Field of Search ............. 330/69, 85, 151, 149; 328/162, 163

[56] References Cited
UNITED STATES PATENTS

| | | | |
|---|---|---|---|
| 1,834,002 | 12/1931 | Nyquist | 330/85 |
| 3,525,052 | 8/1970 | Clark | 330/149 |
| 3,624,532 | 11/1971 | Seider | 330/9 |
| 3,676,790 | 7/1972 | Beurrier | 330/149 X |
| 3,768,028 | 10/1973 | Wolcott et al. | 330/149 X |
| 3,810,256 | 5/1974 | Van Doorn | 330/149 X |

OTHER PUBLICATIONS

Pedersen, "A Distortion–Free Amplifier", *Proceedings of the Ire*, vol. 28, No. 2, Feb. 1960, pp. 59–66.

*Primary Examiner*—James B. Mullins
*Attorney, Agent, or Firm*—S. Sherman; R. O. Nimtz

[57] ABSTRACT

The reference signal applied to the differencing network of a differential feedback amplifier is shaped to conform to the natural gain-vs-frequency characteristic of the principal amplifier. This serves to minimize the amplitude of the error signal that the error amplifier must handle. As a result, the error amplifier is much smaller and can be optimized with respect to its noise and dispersion performance.

5 Claims, 3 Drawing Figures

DIFFERENTIAL FEEDBACK AMPLIFIER WITH FREQUENCY-SHAPED REFERENCE SIGNAL

This application relates to differential feedback amplifiers.

BACKGROUND OF THE INVENTION

In my U.S. Pat. No. 3,624,532 (also see U.S. Pat. Nos. 1,834,002 and 3,525,052) a feedback amplifier is described wherein a component of the amplifier output signal is compared with a component of the amplifier input signal and a difference, or error signal produced. The latter, which represents the distortion introduced by the principal amplifier, is amplified in a subsidiary error amplifier and then fed back to the input end of the principal amplifier so as to minimize the distortion in the amplifier output signal.

As noted in my above-cited patent, it is an advantage of a differential feedback amplifier that only the error is fed back and, hence, only the error is degenerated by the feedback process. It is a second advantage of such an amplifier that the dynamic range of the error amplifier is very much less than the dynamic range of the principal amplifier since the former is only required to handle the error signal and, hence, will typically have a much broader bandwidth than the principal amplifier. As a result, the overall frequency sensitivity of the feedback loop of a differential feedback amplifier is significantly less than that of a conventional feedback amplifier having the same net gain. Consequently, the stabilized bandwidth of the former is much greater.

The above-described advantages are readily realized but within limits. For example, at the higher frequencies, the typical rolloff in the principal amplifier gain characteristic introduces added time delay, and causes an increase in the magnitude of the error signal that must be handled by the error amplifier. Thus, any attempt to expand the operating frequency so as to include these higher frequencies will require a much larger error amplifier of reduced bandwidth. The net result of the combination of additional time delay through the principal amplifier, and the added delay through a larger error amplifier is to cause a reduction in the overall stability of the amplifier.

It is, accordingly, the broad object of the present invention to extend the stable operating range of a differential feedback amplifier.

SUMMARY OF THE INVENTION

In accordance with the present invention, the reference signal applied to the difference network of a differential feedback amplifier is shaped to conform to the gain-vs-frequency characteristic of the principal amplifier. This serves to minimize the amplitude of the difference signal that the error amplifier is called upon to handle. As such, the error amplifier can be made very small, thus reducing the time delay through the latter to a very minimum.

Having referenced the amplifier output signal with respect to a frequency-shaped characteristic, a compensating passive equalizing network can be added at the output of the amplifier to produce any desired overall gain-vs-frequency characteristic.

It will be noted that in this arrangement, the amplifier is stabilized to a more natural standard, i.e., its own natural characteristic. As a result, the output power requirements of the error amplifier are radically reduced. This reduction allows for the use of a smaller error amplifier that is optimally tailored with respect to noise and dispersion performance. This, in turn, yields a significantly increased loop-gain-bandwidth performance for the feedback system as a whole.

These and other objects and advantages, the nature of the present invention, and its various features, will appear more fully upon consideration of the various illustrative embodiments now to be described in detail in connection with the accompanying drawings.

DETAILED DESCRIPTION

Figure 1:
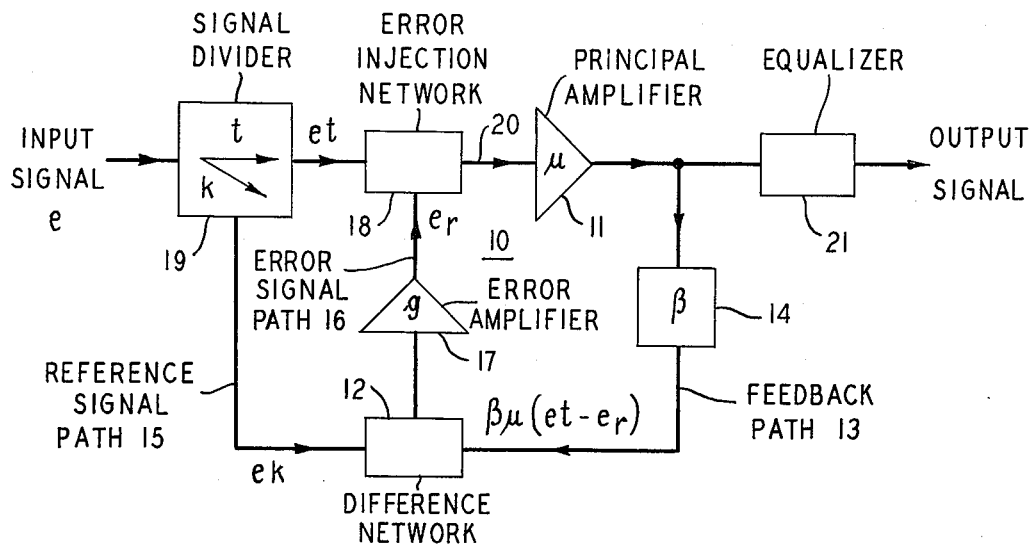
FIG. 1 shows, in block diagram, one embodiment of a differential feedback circuit in accordance with the present invention.

Referring to the drawings, FIG. 1 shows, in block diagram, a differential feedback amplifier 10, employing a frequency-shaped reference signal in accordance with the present invention. The amplifier includes: a principal amplifier 11 having a given gain characteristic $\mu$; a difference network 12; a feedback path 13, including an attenuating network 14 connecting the output end of amplifier 11 to one input port of network 12; an input signal divider 19 having a coefficient of transmission $t$ and a coefficient of coupling $k$; a reference signal path 15 for coupling one output port of said signal divider 19 to a second input port of network 12; an error injection network 18 having one input port connected to a second output port of divider 19; an error signal path 16, including an error amplifier 17 having a flat gain characteristic $g$, connecting the output port of difference network 12 to a second input port of injection network 18; a signal path 20 for connecting the output port of injection network 18 to the input end of amplifier 11; and an equalizer network 21 connected to the output end of amplifier 10.

In operation, a first portion $et$ of the input signal $e$ is coupled to the input end of amplifier 11 along with the signal $e_r$ derived from error amplifier 17. A portion $\beta$ of the amplified signal $\mu(et-e_r)$ is coupled back to difference network 12, along with a second component $ek$ of the input signal, to form a difference signal. The latter, which is a measure of the distortion (i.e., error) introduced by amplifier 11, is amplified by error amplifier 17 and, as noted above, the resulting signal $e_r$ is coupled to the input end of amplifier 11 by means of error injection network 18. More specifically, the amplitude and phase of the injected error signal is proportioned to minimize the net distortion in the output of amplifier 11.

As explained in my above-cited patent, one of the advantages of a differential feedback amplifier is that it has a signal-to-noise ratio that is essentially that of the error amplifier. Since the latter is only required to handle the relatively small error signal, it is a much smaller amplifier than the principal amplifier and has a much lower noise figure. Also, as noted above, the smaller the error amplifier, the greater can be its bandwidth. As a result, the overall frequency sensitivity of the feedback loop of a differential feedback amplifier is significantly less than that of a conventional feedback amplifier having the same net gain.

Inasmuch as the overall characteristics of a differential feedback amplifier are determined primarily by the characteristics of the error amplifier, it is advantageous that the error amplifier be a small, high quality, broadband amplifier. On the other hand, the error amplifier must be able to handle the largest possible error signal that may be produced. Accordingly, it is the purpose of the invention to select the parameters of the embodiment of FIG. 1 so as to minimize the magnitude of the error signal.

Figure 2:
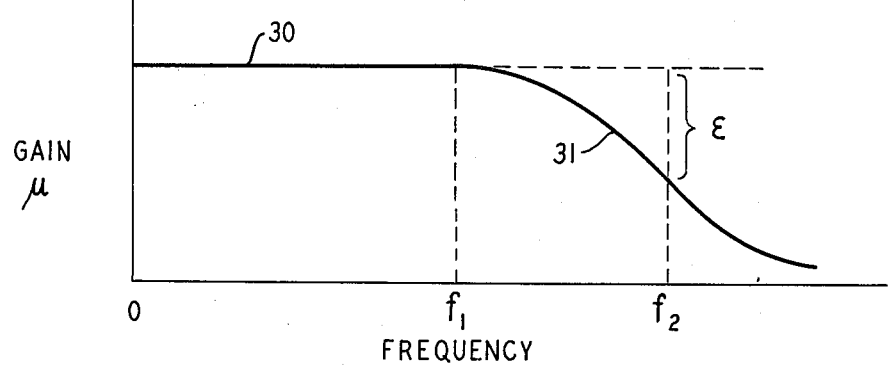
FIG. 2, included for purposes of explanation, shows a typical amplifier gain characteristic.

FIG. 2, now to be considered, shows a typical gain-vs-frequency characteristic of an amplifier. Between zero frequency and some frequency $f_1$, the curve 30 is relatively flat. Thus, over this range of frequencies, the error signal, due to noise and minor variations in the characteristic, will be relatively small. However, at the higher frequencies above $f_1$, the gain characteristic, represented by curve portion 31, tends to roll off. This introduces an ever increasing error component as the feedback attempts to compensate for the decreasing gain. The effect of this is to require an error amplifier of increased dynamic range. For example, let us consider a specific 50 ohm system having a bandwidth of 100 MHz wherein $t=k=1$, $\mu=10$, $g=100$, and wherein the error amplifier has a noise figure of 4 dB. In such a system operating at a 10 volt output level, an error amplifier having a dynamic range of 40 dB would be capable of handling error signals resulting from a change in the gain characteristic $\mu$ of the principal amplifier of up to 7 percent. If $\mu$ drops off by 20 percent, the required dynamic range increases to over 50 dB. A 50 percent change in $\mu$ would require an error amplifier with a 60 dB dynamic range. This, clearly, is undesirable and, in effect, places a limit on the useful bandwidth of the total amplifier 10.

The above-described difficulty arises because we have chosen to force amplifier 10 to have a flat gain characteristic over the entire frequency band of interest. To illustrate, the error amplifier output signal $e_r$ is given by $$e_r = \frac{g(t\mu\beta - k)}{1 + g\mu\beta} e, \qquad (1)$$

where the coefficients $t$ and $k$ of divider 19 are constants over the band of interest; $\mu$ is the principal amplifier gain function; and $g$ is the error amplifier gain function.

Over the range of frequencies where $\mu$ is constant, the error signal vanishes by making $$t\mu\beta - k = 0. \qquad (2)$$

However, as $\mu$ falls off at the higher frequencies, this difference starts to increase. If, however, $k$ is also permitted to vary as a function of frequency, the difference between $t\mu\beta$ and $k$ can be kept small. In particular, if $k$ is made to have the same frequency characteristic as $\mu$, equation (2) can be made to hold over the entire operating band of interest.

Thus, in accordance with the present invention, the reference signal coupled to the difference network is shaped to conform to the natural frequency characteristic of the principal amplifier. This, in turn, allows the differential feedback system to stabilize to a more naturally occurring standard. As the output power requirements of the error amplifier are radically reduced, a much smaller error amplifier, designed for optimum noise and dispersion performance, can be used.

At first blush, it would appear that the introduction of dispersion (i.e., added delay) in the reference signal path might adversely affect the feedback response. Hence, in the past, minimal transmit time was sought for this network. However, as is evident from the denominator of equation (1), the reference signal path does not enter into the feedback loop and, hence, added delay in this circuit does not affect the feedback response.

Having designed the feedback amplifier in the manner described, the overall gain characteristic is no longer flat but, rather, trails off in the manner illustrated in FIG. 2 by curve portion 31. In order to obtain a flat response, or any other overall response, an equalizer 21, having a compensating transmission characteristic, is located in the amplifier output circuit.

Figure 3:
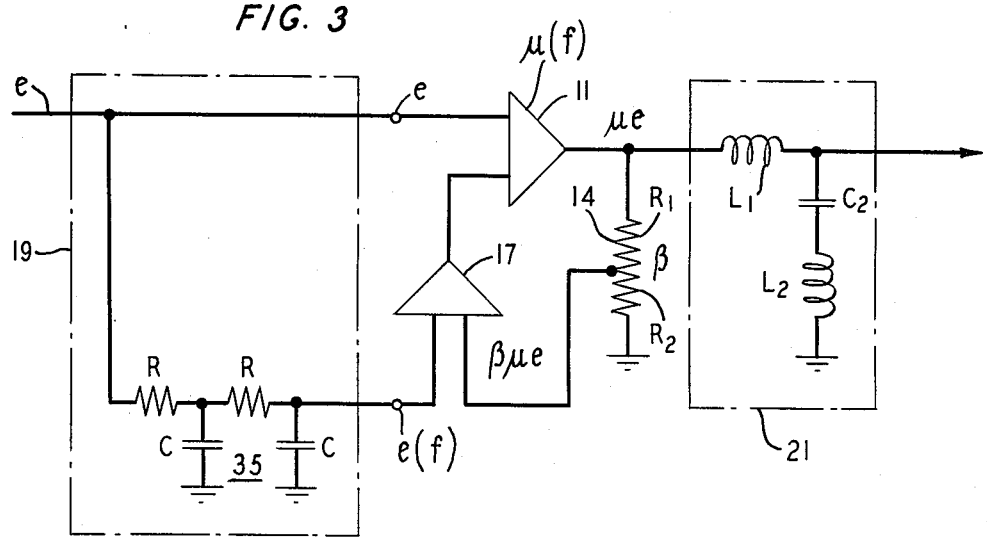
FIG. 3 shows a specific embodiment of the invention.

FIG. 3, now to be considered, shows a specific embodiment of a differential feedback amplifier in accordance with the present invention. Using the same identification numerals as was used in FIG. 1 to identify corresponding components, the amplifier includes a principal amplifier 11, and an error amplifier 17. In this embodiment, both amplifiers 11 and 17 are shown as differential amplifiers, thus eliminating the need for a separate difference network 12 and a separate error injection network 18. Attenuator 14 is a resistive divider made up of a pair of series-connected resistors $R_1$ and $R_2$. The feedback factor $\beta$ is given by the ratio $R_2/(R_1 + R_2)$.

The signal divider 19 connects the input signal $e$ directly to one input port of amplifier 11, so that for this embodiment $t = 1$. However, the reference path, connecting the input signal to one input port of error amplifier 17 includes a two-stage R-C filter 35. Thus, $k$ is a function of frequency as defined by the R-C filter. Advantageously, the filter has a frequency characteristic that is proportional to the principal amplifier gain characteristic.

The output from the error amplifier is coupled to the other input port of amplifier 11. The output from amplifier 11 is coupled to equalizer 21 which comprises a series branch including an inductor $L_1$, and a shunt branch including an inductor $L_2$ and a capacitor $C_2$ connected in series. The components of equalizer 21 are proportioned so as to produce any desired, overall gain characteristic.

SUMMARY

The gain-vs-frequency characteristic of a differential feedback amplifier is defined by the frequency characteristic of the reference signal. In accordance with the present invention, the frequency characteristic of the reference signal is made to be proportional to the gain-vs-frequency of the principal amplifier. This serves to minimize the amplitude of the difference signal that the error amplifier is called upon to handle.

By stabilizing the principal amplifier to a more natural standard, i.e., its own frequency characteristic, a smaller error amplifier can be used. As a result the error amplifier can be optimized with respect to noise and dispersion performance.

The final, overall gain characteristic of the amplifier is determined by a passive equalizer circuit connected to the output terminal of the differential amplifier.

In all cases it is understood that the above-described arrangement is illustrative of but some of the many possible specific embodiments which can represent applications of the principals of the invention. Numerous and varied other arrangements can readily be devised in accordance with these principals by those skilled in the art without departing from the spirit and scope of the invention.

What is claimed is:

1. A differential feedback amplifier comprising
a principal amplifier having a given gain-vs-frequency characteristic which varies as a function of frequency;
means for comparing a portion of the output signal derived from said principal amplifier with a reference signal and for forming a difference signal;
means for amplifying and injecting said difference signal into the input end of said principal amplifier;
characterized in that:
the frequency characteristic of said reference signal follows essentially the gain-vs-frequency characteristic of said principal amplifier.

2. The amplifier according to claim 1 including an equalizer connected to the output port of said differential amplifier.

3. The amplifier according to claim 2 wherein said equalizer has a compensating frequency characteristic for producing a flat gain characteristic over a specified frequency band of interest.

4. The amplifier according to claim 1 wherein the gain characteristic of said principal amplifier has a high frequency rolloff; and wherein said reference signal has the same high frequency rolloff characteristic.

5. A differential feedback amplifier comprising:
a first differential amplifier having a gain characteristic which varies with frequency over a specified frequency band of interest;
a second differential amplifier having a gain characteristic which is substantially constant over said specified frequency band of interest;
a signal divider for coupling between a common input port and one of the input ports of each of said amplifiers;
said divider having a coefficient of transmission $t$ between said common input port and the one input port of said first amplifier, and a coefficient of coupling $k$ between said common input port and the one input port of the second amplifier;
a feedback path, including an attenuator, connecting the output port of said first amplifier to a second input port of said second amplifier;
and means for coupling the output port of said second amplifier to a second input port of said first amplifier;
characterized in that:
the coupling coefficient $k$ is proportional to the gain characteristic of said first amplifier over a specified frequency band of interest.

* * * * *